US012729353B2

(12) United States Patent
Kubota et al.

(10) Patent No.: US 12,729,353 B2
(45) Date of Patent: Sep. 8, 2026

(54) BEER-FLAVORED LOW-ALCOHOL BEVERAGE

(71) Applicant: Asahi Group Holdings, Ltd., Tokyo (JP)

(72) Inventors: Jun Kubota, Moriya (JP); Mari Baba, Moriya (JP); Wataru Nakayama, Moriya (JP)

(73) Assignee: ASAHI GROUP HOLDINGS, LTD., Tokyo (JP)

(*) Notice: Subject to any disclaimer, the term of this patent is extended or adjusted under 35 U.S.C. 154(b) by 289 days.

(21) Appl. No.: 18/272,659

(22) PCT Filed: Jan. 21, 2022

(86) PCT No.: PCT/JP2022/002163
§ 371 (c)(1),
(2) Date: Jul. 17, 2023

(87) PCT Pub. No.: WO2022/163522
PCT Pub. Date: Aug. 4, 2022

(65) Prior Publication Data

US 2024/0141263 A1 May 2, 2024

(30) Foreign Application Priority Data

Jan. 28, 2021 (JP) ................................ 2021-012325

(51) Int. Cl.
*C12C 12/04* (2006.01)

(52) U.S. Cl.
CPC .................................. *C12C 12/04* (2013.01)

(58) Field of Classification Search
CPC ..................................................... C12C 12/04
See application file for complete search history.

(56) References Cited

U.S. PATENT DOCUMENTS

| | | | | |
|---|---|---|---|---|
| 5,384,135 A * | 1/1995 | Caluwaerts | C12G 3/08 426/493 |
| 2015/0017280 A1 * | 1/2015 | Vanderhaegen | C12G 3/06 426/534 |
| 2017/0121657 A1 * | 5/2017 | Kozaki | C12C 11/11 |

FOREIGN PATENT DOCUMENTS

| | | |
|---|---|---|
| CN | 104220585 | 12/2014 |
| EP | 3 564 352 | 11/2019 |
| JP | 48-067496 | 9/1973 |
| JP | 2014-68610 | 4/2014 |
| JP | 2015-223120 | 12/2015 |
| JP | 2016-123415 | 7/2016 |
| JP | 2017-205035 | 11/2017 |
| JP | 2017-216891 | 12/2017 |
| JP | 2018-174869 | 11/2018 |
| JP | 2019154428 A * | 9/2019 |
| JP | 2019-201659 | 11/2019 |
| JP | 2020-28275 | 2/2020 |
| JP | 2020-162602 | 10/2020 |

OTHER PUBLICATIONS

Shimizu et al., JP 2020103209 A, Jul. 9, 2020, Derwent Abstract. (Year: 2020).*
International Search Report issued Mar. 29, 2022 in corresponding International (PCT) Patent Application No. PCT/JP2022/002163.
International Preliminary Report on Patentability issued Jul. 31, 2023 in corresponding International (PCT) Patent Application No. PCT/JP2022/002163.
Extended European Search Report issued Nov. 14, 2024 in corresponding European Patent Application No. 22745743.9.
Kobayashi et al., "Simultaneous control of apparent extract and volatile compounds concentrations in low-malt beer fermentation", Applied Microbiology and Biotechnology, Springer, Berlin, DE, vol. 73, No. 3, Jul. 2006, pp. 549-558, XP019458742, ISSN: 1432-0614, DOI: 10.1007/S00253-006-0516-1.
Brauindustrie, vol. 67, 1982, pp. 1086-1090, 1426-1432, 1552-1557.
Jakub Nepor et al., "Volatile Compound Profiling in Czech and Spanish Lager Beers in Relation to Used Technology", Food Analytical Methods, Jan. 11, 2019, vol. 12, 2293-2305, pp. 1-14.
L. Fillaudeau et al., "Investigation of rotating and vibrating filtration for clarification of rough beer", Journal of Food Engineering, 2007, vol. 80, pp. 206-217.
JPO Office Action issued May 20, 2025 in corresponding Japanese Patent Application No. 2022-578322, with machine English-language translation.

* cited by examiner

*Primary Examiner* — Stephanie A Kohler
(74) *Attorney, Agent, or Firm* — Wenderoth, Lind & Ponack, L.L.P.

(57) ABSTRACT

An object of the invention is to provide a method for suppressing sourness and astringency of a low-alcohol beer-taste beverage, and enhancing an alcohol feeling and a complex taste derived from brewing. The means for solving the problems is a low-alcohol beer-taste beverage containing an aroma composition containing: 0.49 ppm or more of ethyl acetate, 0.83 ppm or more of isobutanol, 0.065 ppm or more of isoamyl acetate, and 4.35 ppm or more of isoamyl alcohol.

15 Claims, No Drawings

BEER-FLAVORED LOW-ALCOHOL BEVERAGE

CROSS-REFERENCE TO RELATED APPLICATION

This application claims the benefit under Article 4 of the Paris Convention based on Japanese Patent Application No. 2021-12325 filed on Jan. 28, 2021 incorporated herein by reference in its entirely.

TECHNICAL FIELD

The present invention relates to a low-alcohol beer-taste beverage. "Low-alcohol beer-taste beverage" means a beer-taste beverage with an alcohol content of less than 1% (V/V). The meaning of "low-alcohol beer-taste beverage" also includes non-alcohol beer-taste beverages that are substantially free of alcohol. In addition, the term "alcohol" means ethanol.

BACKGROUND ART

The "beer taste beverage" means a beverage having a taste and an aroma reminiscent of beer. "Beer" means a beverage obtained by using as raw materials malt, hops, water and the like, and fermenting these.

Background Technology

Beer-taste beverages contain aroma components. The aroma component is a component that exhibits a scent. The aroma component is volatile and firstly acts on the sense of smell when drinking a beer-taste beverage. Therefore, the type and content of the aroma component not only influences the aroma of the beer-taste beverage, but also greatly affects how the taste is perceived.

Patent Document 1 relates to a beer-taste beverage containing alcohol with a high malt use ratio, and describes the problem that it feels like astringency derived from malt that is a raw material, and sourness derived from a sourness-imparting substance that is a metabolite of yeast stand out. In response to this problem, in Patent Document 1, the total amount of polyphenols is adjusted to 200 ppm or less and the content of isoamyl acetate is adjusted from 3 to 8 ppm to obtain a beer-taste beverage having a mild sourness while suppressing astringency.

Patent Document 2 discloses that by using a specific ester component in combination with a bitterness component, it is possible to produce a beer-taste beverage having a beer-like aroma and a robust feeling of drinking only by blending raw materials without preparing the raw materials. As ester components, 1 to 15 mg/L of ethyl acetate and/or 0.5 to 10 mg/L of isoamyl acetate are described.

Patent Document 3 discloses that if a low-alcohol beverage contains at least one of normal propanol, isobutyl alcohol, and isoamyl alcohol, that the total amount of normal propanol, isobutyl alcohol, and isoamyl alcohol in the beverage is 5.0 ppm or more, and that the ratio of the sweetness degree/the sourness degree is from 0 to 18 or less, a sake-like taste can be enhanced.

PATENT DOCUMENT

[Patent Document 1] JP 2017-205035 A
[Patent Document 2] JP 2017-216891 A
[Patent Document 3] JP 2016-123415 A

SUMMARY

Problem to be Solved by the Invention

Ordinary beer (that is, a beer-taste beverage containing alcohol) contains alcohol and is bacteriostatic. On the other hand, low-alcohol beer-taste beverages have a low alcohol concentration and reduced bacteriostatic properties. Therefore, in order to distribute them to the market, it is necessary to increase the acidity of the beverage and improve the bacteriostatic properties from the viewpoint of preventing putrefaction. For example, refer to the standards for foods and additives (Ministry of Health and Welfare Notification No. 370, 1959, https://www.mhlw.go.jp/content/000420821.pdf). That is, in the low-alcohol beer taste beverage, it is necessary to sufficiently lower the pH to improve the bacteriostatic properties, and a pH adjuster such as an acidulant is added. As a result, the low-alcohol beer-taste beverage has a flavor with an emphasized sour feeling and astringent feeling.

Further, in a normal beer-taste beverage, astringency and sourness are masked by alcohol stimulation and aroma components. The term "masking" as used herein means to suppress an unpleasant sense by adding another flavor to an unpleasant flavor. Further, the meaning of masking also includes imparting palatability by adding another flavor to the unpleasant flavor.

On the other hand, when a low-alcohol beer is produced by removing the alcohol content from a beer-taste beverage, alcohol and highly volatile aroma components are also removed from the wort fermented liquid. As a result, the alcohol-removed beer-taste beverage has a flavor with an emphasized astringent feeling and sour feeling.

As described above, the low-alcohol beer-taste beverage tends to have a stronger sour feeling and astringent feeling, and a weaker alcohol feeling and complex taste derived from brewing, as compared with a beer-taste beverage containing alcohol. The factor of this unpleasant taste is strongly exhibited when the alcohol content is distilled and removed from the wort fermented liquid to obtain a fermented low-alcohol beer-taste beverage.

An object of the present invention is to provide a low-alcohol beer-taste beverage in which sourness and astringency are suppressed, and a complex taste derived from brewing is enhanced.

Solution to the Problems

The present invention provides a low-alcohol beer-taste beverage containing an aroma composition containing:

0.49 ppm or more of ethyl acetate,
0.83 ppm or more of isobutanol,
0.065 ppm or more of isoamyl acetate, and
4.35 ppm or more of isoamyl alcohol.

In one embodiment, the aroma composition contains 0.49 to 26 ppm of ethyl acetate, 0.83 to 120 ppm of isobutanol, 0.065 to 1.4 ppm of isoamyl acetate, and 4.35 to 90.3 ppm isoamyl alcohol.

In one embodiment, the low-alcohol beer-taste beverage contains a sour component in an amount of 1,000 ppm or more as the degree of sourness.

In one embodiment, the low-alcohol beer-taste beverage contains a sour component in an amount of 1,000 to 3,500 ppm as the degree of sourness.

In one embodiment, aroma components of the aroma composition are derived from a wort fermented liquid.

In one embodiment, the wort fermented liquid is a wort bottom fermented liquid.

In one embodiment, the wort fermented liquid has a malt use ratio of 50% or more.

In one embodiment, the low-alcohol beer-taste beverage contains an alcohol-removed wort fermented liquid.

Also, the present invention provides a method for producing a low-alcohol beer-taste beverage, comprising:

- a step of adjusting the carbon dioxide gas pressure of a wort fermented liquid from 0.05 to 0.25 MPa;
- a step of vaporizing carbon dioxide gas and aroma components from the wort fermented liquid by spraying the wort fermented liquid under reduced pressure;
- a step of condensing vaporized aroma components to obtain an aroma composition; and
- a step of adding the obtained aroma composition to a low-alcohol beer-taste beverage.

Also, the present invention provides a method for suppressing sourness and astringency, and enhancing an alcohol feeling and a complex taste derived from brewing of a low-alcohol beer-taste beverage, comprising:

- a step of adjusting the carbon dioxide gas pressure of a wort fermented liquid from 0.05 to 0.25 MPa;
- a step of vaporizing carbon dioxide gas and aroma components from the wort fermented liquid by spraying the wort fermented liquid under reduced pressure;
- a step of condensing the vaporized aroma components to obtain an aroma composition; and
- a step of adding the obtained aroma composition to a low-alcohol beer-taste beverage.

In one embodiment, the low-alcohol beer-taste beverage to which the aroma composition is added is obtained by subjecting the wort fermented liquid to an alcohol-removing treatment.

In one embodiment, the aroma composition contains 0.49 ppm or more of ethyl acetate, 0.83 ppm ox more of isobutanol, 0.065 ppm or more of isoamyl acetate, and 4.35 ppm or more of isoamyl alcohol.

In one embodiment, the aroma composition contains 0.49 to 26 ppm of ethyl acetate, 0.83 to 120 ppm of isobutanol, 0.065 to 1.4 ppm of isoamyl acetate, and 4.35 to 90.3 ppm of isoamyl alcohol.

Effects of the Invention

According to the present invention, there is provided a low-alcohol beer-taste beverage in which sourness and astringency are suppressed, and an alcohol feeling and a complex taste derived from brewing are enhanced by containing specific aroma components.

DETAILED DESCRIPTION

Aroma Composition

In the present invention, the aroma composition means a composition containing ethyl acetate, isobutanol, isoamyl acetate, and isoamyl alcohol, which are aroma components of beer, in specific amounts. The amount of an aroma component contained in the aroma composition is expressed as the concentration in the state of being contained in the low-alcohol beer taste beverage.

The respective aroma components, each with a content of a specific amount or more, are combined and thereby, the astringency and sourness of the low-alcohol beer-taste beverage are suppressed or masked, and the drinker can feel a beer-like flavor. Therefore, the content of the aroma component may be adjusted within a range in which the effect of suppressing or masking the astringency or sourness can be obtained, and it is not necessary to specify the upper limit thereof in order to solve the problem of the invention.

The aroma component may be artificially chemically synthesized or derived from a natural substance, for example, the one obtained as a fermentation metabolite by yeast. From the viewpoint of optimizing the content ratio of each aroma component, it is particularly preferable that the aroma component is derived from a wort fermented liquid obtained as a fermentation metabolite by yeast.

Ethyl acetate is an ester represented by the formula $CH_3COOC_2H_5$ and is an aroma component having a fruity odor. In the low-alcohol beer-taste beverage of the present invention, the concentration of ethyl acetate is 0.49 ppm or more, preferably 0.98 ppm or more, and more preferably 1.46 ppm or more from the viewpoint of suppressing the sourness of the low-alcohol beer-taste beverage. The upper limit of the concentration of ethyl acetate is, for example, 26 ppm or less, preferably 19 ppm or less, and more preferably 14.3 ppm or less. The upper limit and the lower limit of the numerical range of the present specification can be optionally selected and combined.

In one embodiment, the concentration of ethyl acetate in the low-alcohol beer-taste beverage is preferably 0.49 to 26 ppm, more preferably 0.98 to 19 ppm, and still more preferably 1.46 to 14.3 ppm.

Isobutanol is an alcohol represented by the formula $(CH_3)_2CHCH_2OH$, also referred to as isobutyl alcohol, and is an aroma component having a pungent fermented odor. In the low-alcohol beer-taste beverage of the present invention, the concentration of isobutanol is 0.83 ppm or more, preferably 1.66 ppm or more, and more preferably 2.48 ppm or more from the viewpoint of suppressing the sourness of the low-alcohol beer-taste beverage. The upper limit of the concentration of isobutanol is, for example, 120 ppm or less, preferably 90 ppm or less, and more preferably 17.9 ppm or less.

In one embodiment, the concentration of isobutanol in the low-alcohol beer-taste beverage is preferably 0.83 to 120 ppm, more preferably 1.66 to 90 ppm, and still more preferably 2.48 to 17.9 ppm.

Isoamyl acetate is an ester represented by the formula $CH_3COO(CH_2)_2CH(CH_3)_2$, and is an aroma component having a banana-like fruity odor. In the low-alcohol beer-taste beverage of the present invention, the concentration of isoamyl acetate is 0.065 ppm or more, preferably 0.13 ppm or more, and more preferably 0.2 ppm or more, from the viewpoint of suppressing the sourness of the low-alcohol beer-taste beverage. The upper limit of the concentration of isoamyl acetate is, for example, 1.4 ppm or less, preferably 1.0 ppm or less, and more preferably 0.5 ppm or less.

In one embodiment, the concentration of isoamyl acetate in the low-alcohol beer-taste beverage is preferably 0.065 to 1.4 ppm, more preferably 0.13 to 1.0 ppm, and still more preferably 0.2 to 0.5 ppm.

Isoamyl alcohol is an alcohol represented by the formula $(CH_3)_2CHCH_2CH_2OH$ and tends to make the flavor of beer sweeter and heavier. In the low-alcohol beer-taste beverage of the present invention, the concentration of isoamyl alcohol is 4.35 ppm or more, preferably 8.7 ppm or more, and more preferably 13.1 ppm or more from the viewpoint of suppressing the sourness of the low-alcohol beer-taste beverage. The upper limit of the concentration of isoamyl alcohol is, for example, 90.3 ppm or less, preferably 80 ppm or less, and more preferably 60 ppm or less.

In one embodiment, the concentration of isoamyl alcohol in the low-alcohol beer-taste beverage is preferably 4.35 to 90.3 ppm, more preferably 8.7 to 80 ppm, and still more preferably 13.1 to 60 ppm.

The sensory thresholds of the above aroma components are 21 ppm or 30 ppm for ethyl acetate, 100 ppm to 200 ppm for isobutanol, 0.6 ppm or 1.2 ppm for isoamyl acetate, and 70 ppm for isoamyl alcohol (edited and published by the Brewing Society of Japan: Brewing). Ingredients of the brew (1999)). Here, the sensory threshold means the minimum concentration at which a human perceives a scent. Even when the aroma composition used in the present invention contains the above aroma components in an amount equal to or less than the sensory threshold, the aroma composition exerts its effect by combining them.

Sour Component

The sour component is a component that imparts sourness to the low-alcohol beer-taste beverage. The sour component is preferably obtained as a fermentation metabolite by yeast from the viewpoint that the sourness does not become too strong. Specific examples of sour component include phosphoric acid, citric acid, pyruvic acid, DL-malic acid, succinic acid, lactic acid, formic acid, glacial acetic acid, pyroglutamic acid, adipic acid, trisodium citrate, gluconodeltalactone, gluconic acid, potassium gluconate, sodium gluconate, monosodium succinate, disodium succinate, sodium acetate, DL-tartaric acid, L-tartaric acid, DL-sodium tartrate, L-sodium tartrate, sodium lactate, fumaric acid, monosodium fumarate, DL-sodium malate and the like. The sour component contained in the low-alcohol beer-taste beverage of the present invention may be a combination of these.

The degree of sourness of a sour substance may be quantified based on the sourness of citric acid. JP 2017-000104 A describes the degrees of sourness of sour substances when citric acid is 100 as follows.

TABLE 1

| Degrees of sourness of sour substance in citric acid equivalent | |
|---|---|
| Citric acid | 100 |
| Phosphoric acid | 200 |
| Malic acid | 125 |
| Succinic acid | 115 |
| Lactic acid | 120 |
| Acetic acid | 105 |

In the low-alcohol beer-taste beverage of the present invention, the content of the sour component is expressed as the degree of sourness in order to quantify the degree of sourness. The degree of sourness of one type of sour component is the product of the concentration of the sour component and the degree of sourness when citric acid is 1. The sum of the degrees of sourness of all the sour components is the degree of sourness of the low-alcohol beer-taste beverage.

In the low-alcohol beer-taste beverage of the present invention, the degree of sourness is 3500 ppm or less, preferably 3000 ppm or less, and more preferably 2500 ppm or less from the viewpoint of suppressing the sourness by the aroma component. Further, in the low-alcohol beer-taste beverage of the present invention, the lower limit of the degree of sourness is not particularly limited. However, when the degree of sourness is low, it is not necessary to suppress the sourness by using the aroma component. Therefore, the degree of sourness is, for example, 1000 ppm or more, preferably 1200 ppm or more, and more preferably 1400 ppm or more.

In one embodiment, the degree of sourness is preferably 1000 to 3500 ppm, more preferably 1200 to 3000 ppm, and still more preferably 1400 to 2500 ppm.

Wort Fermented Liquid

Generally, a saccharide liquid obtained by enzymatically treating a raw material containing malt is called wort. The wort fermented liquid is a liquid obtained by fermenting the wort used in the production of ordinary beer. The wort fermented liquid may be a wort top fermented liquid or a wort bottom fermented liquid. The wort top fermented liquid is a wort fermented liquid obtained by inoculating wort with top-fermenting yeast and fermenting it at normal fermentation conditions, for example, 15 to 25° C. for several days. The wort bottom fermented liquid is a wort fermented liquid in which wort is inoculated with bottom fermenting yeast and fermented at normal fermentation conditions, for example, at around 10° C. for about one week.

Production of Wort Fermented Liquid

The method for producing a wort fermented liquid will be described below.

First, crushed malt, auxiliary raw materials such as barley, and warm water are placed into a preparation tank and mixed to prepare maische. The preparation of the maische may be performed by a conventional method. For example, first, by holding at 35 to 60° C. for 20 to 90 minutes, proteins derived from raw materials is decomposed into amino acids and the like, and then, a saccharifying step is conducted. At this stage, as necessary, enzyme agents, as mentioned below, such as a saccharifying enzyme and a protease, and flavor components such as spices and herbs, and the like may be added other than the main raw materials and the auxiliary raw materials.

Then, by gradually raising the temperature of the maische and holding it at a predetermined temperature for a certain period of time, starchy component is saccharified by utilizing an enzyme derived from malt or an enzyme added to the maische. The temperature and time during the saccharifying treatment may be appropriately determined in consideration of the type of enzyme used, the amount of maische, the quality of the intended wort fermented liquid, and the like, which may be carried out by holding it, for example, at 60 to 72° C. for 30 to 90 minutes. After the saccharifying treatment, the maische is held at 76 to 78° C. for about 10 minutes, and then filtered in a wort filtration tank to obtain a transparent saccharide liquid. Further, when performing the saccharifying treatment, an appropriate amount of the enzyme agent may be added within a necessary range.

Cereals to be saccharified contain malt. The malt content in cereals to be saccharified is not particularly limited, but is 25% or more, preferably 50% or more, and more preferably 67% or more. The cereals to be saccharified may be 100% malt. The ratio (%) of malt to all raw materials excluding water is referred to as a malt use ratio. The higher the malt content in the cereals, the stronger the malt-derived umami, richness and robust feeling of drinking of the obtained wort.

Auxiliary raw materials mean raw materials other than malt and hops. Examples of the auxiliary raw materials are starchy raw materials such as barley, wheat, corn starch, corn grits, rice, and Kaoliang, and saccharide raw materials such as liquid sugar and sugar. Here, the liquid sugar is produced by decomposing and saccharifying starchy component with an acid or a saccharifying enzyme, and mainly contains glucose, maltose, maltotriose and the like. In addition, spices, herbs, fruits and the like used for the purpose of imparting or improving flavor are also included in the auxiliary raw materials.

The saccharifying enzyme means an enzyme for decomposing starchy component into saccharide. As the saccharifying enzyme, there are, for example, α-amylase, glucoamylase, pullanase and the like.

Wort boiling operation may be carried out according to the method and conditions which are commonly carried out when producing beer. For example, a saccharide liquid, the pH of which has been adjusted, is transferred to a boiling kettle, and boiled. During the time from the start of boiling of the saccharide liquid until being left to stand, hops are added in the whirlpool. Hop extract or a component extracted from hops may be used as the hops. The saccharide liquid is then transferred to a precipitation tank called a whirlpool. After hop lees and curdled protein, produced by boiling are removed, the resulting liquid is cooled to an appropriate fermentation temperature by a plate cooler. Wort is obtained by the above wort boiling operation.

The obtained wort is fermented by yeast. Fermentation of wort may be carried out according to a conventional method. For example, beer yeast is inoculated into the cooled wort, and the wort is transferred to a fermentation tank to carry out alcoholic fermentation. For the type of yeast to be inoculated, both top-fermenting yeast and bottom-fermenting yeast may be used, but it is preferred to use bottom-fermenting yeast from the viewpoint of suppressing sourness, astringency and the like.

The apparent final degree of fermentation of the wort fermented liquid is preferably 80% or more. If the apparent final degree of fermentation is less than 80%, amino nitrogen is not sufficiently reduced, and a large amount of acids may need to be added in order to sufficiently lower the pH of the wort fermented liquid. The apparent final degree of fermentation of the wort fermented liquid is preferably 80 to 110%, and more preferably 85 to 100%.

The degree of fermentation is an important index which indicates to what extent fermentation has progressed in beer after fermentation, i.e., the progress of fermentation. Further, the final degree of fermentation means the ratio of the extract that can be assimilated by beer yeast based on the raw wort extract. Here, the extract that can be assimilated by beer yeast is what is obtained by subtracting an extract contained in the produced beer (that is, an extract remaining after fermenting all the extracts that can be used by beer yeast (referred to as a final extract) from the raw wort extract. The apparent final degree of fermentation means the final degree of fermentation which is calculated by using, as the value of final extract, the apparent extract, that is, the extract concentration (% (w/w)) derived from the specific gravity of alcohol-containing beer.

The extract means the non-volatile solid component. The term extract means the non-volatile solid component itself, the amount of the non-volatile solid component, or the concentration of the non-volatile solid component depending on the context.

The apparent final degree of fermentation Vend of a wort fermented liquid may be obtained by, for example, the following formula (1).

$$\text{Vend}\ (\%)=\{(P-\text{End})/P\}\times 100 \quad (1)$$

wherein P is a raw wort extract and Eend is an apparent final extract.

The raw wort extract P is the theoretical wort extract value before alcoholic fermentation, which is back calculated from the alcohol concentration and the extract value of produced beer according to Balling's formula. Specifically, it may be obtained by the method shown in Analytica-EBC (9.4) (2007). In addition, the apparent final extract Eend may be determined by collecting beer in a flask, adding a large amount of fresh pressed yeast, fermenting the mixture at 25° C. while stirring until the extract value does not decrease any more (24 hours), and measuring the apparent extract value in the remaining beer.

The apparent final extract Eend may show a negative value because it is calculated from the alcohol-containing specific density of the final extract. As a result, the apparent final degree of fermentation may exceed 100%.

The apparent final degree of fermentation may be controlled by adjusting, for example, the saccharifying conditions, whether or not the enzyme is used when saccharifying the raw material, the type and blending amount of the raw material, and the like. For example, if the saccharifying time is increased, the concentration of saccharide which can be used by yeast may be increased, and the apparent final degree of fermentation may be increased.

After completion of the fermentation, furthermore, the obtained wort fermented liquid is matured as a maturing process in a liquor storage tank, stored under a low temperature condition of about 0° C., and stabilized. Next, as a filtration step, yeast, proteins and the like are removed by filtering the wort fermented liquid after maturation to obtain a wort fermented liquid.

The obtained wort fermented liquid has a genuine extract component of 1.75 to 8.00% (w/w). If the content of the genuine extract component is less than 1.75% (w/w), the beer-like flavor of the obtained beer taste beverage can disappear and watery feeling can arise. On the other hand, if the content of the genuine extract component exceeds 8.00% (w/w), the beer-like sharpness of the obtained beer taste beverage can become weak. The content of the genuine extract component is preferably 2.50 to 5.50% (w/w), and more preferably 3.00 to 5.00% (w/w).

The genuine extract component content of the wort fermented liquid may be measured by, for example, the EBC method (BCOJ Beer Analysis Method, 7.2 (2004), edited by the Beer Brewery Association).

Production of Aroma Composition

The aroma composition used in the present invention can be produced, for example, by blending a predetermined amount of each aroma component. Further, in a preferred embodiment, the aroma composition can be produced by vaporizing aroma components from the wort fermented liquid and recovering these.

As a method of vaporizing the aroma components from the wort fermented liquid, for example, a method of adjusting the carbon dioxide gas pressure of the wort fermented liquid from 0.05 to 0.25 MPa and spraying the wort fermented liquid under reduced pressure is cited. By adjusting the carbon dioxide gas pressure before spraying the wort fermented liquid to the above range, the ratio of the content of each aroma component is optimized. The carbon dioxide gas pressure is preferably adjusted from 0.05 to 0.2 MPa, and more preferably from 0.15 to 0.2 MPa.

The ambient pressure when spraying the wort fermented liquid is preferably 50 to 200 mbar, more preferably 70 to 150 mbar, and still more preferably 80 to 100 mbar. By adjusting the ambient pressure to the above range, the vaporization efficiency of the aroma components is improved. The wort fermented liquid can be sprayed, for example, in a tank whose internal pressure is adjusted to the above range.

The temperature of the wort fermented liquid at the time of spraying is 40 to 70° C., preferably 47 to 68° C., and more preferably 55 to 65° C. By adjusting the temperature of the wort fermented liquid at the time of spraying to the above range, each aroma component can be efficiently vaporized.

Examples of the method of recovering the vaporized aroma component include a method of condensing the gas of the aroma component by cooling according to a conventional method. The condensed liquid is an aroma composition containing the specific aroma component in a specific amount. The obtained aroma composition may contain aroma components contained in ordinary beer, such as ethyl caproate, ethyl caprylate, and β-phenethyl acetate.

Production of Low-Alcohol Beer-Taste Beverage

The low-alcohol beer-taste beverage of the present invention can be produced by blending the aroma composition with the low-alcohol beer-taste beverage in a predetermined amount. The low-alcohol beer-taste beverage with which the aroma composition is blended may be a fermented low-alcohol beer-taste beverage produced through the fermentation process or a non-fermented low-alcohol beer-taste beverage produced without undergoing the fermentation process.

In a preferred embodiment, the low-alcohol beer-taste beverage with which the aroma composition is blended is a fermented low-alcohol beer-taste beverage from the viewpoint of enhancing the alcohol feeling and complex taste derived from brewing. Among them, a fermented low-alcohol beer-taste beverage obtained by distilling and removing the alcohol content from the wort fermented liquid is preferred.

From the viewpoint of optimizing the flavor balance, more preferably, the low-alcohol beer-taste beverage with which an aroma composition is blended is a low-alcohol beer-taste beverage obtained by subjecting a wort-fermented liquid in which the aroma composition is volatilized to an alcohol-removing treatment, that is, an alcohol-removed wort fermented liquid.

The present invention will be described in more detail with reference to the following examples, but the present invention is not limited to these.

EXAMPLES

Examples

[Production of Wort Fermented Liquid]

Crushed malt, water, and corn starch were put in a preparation kettle, gelatinized at 70° C., and liquefied at 100° C. Next, crushed malt, an enzyme and warm water were put in a preparation tank, protein was decomposed at around 55° C., and then the liquid was transferred from the preparation kettle to the preparation tank, and saccharifying was performed at a temperature in the range of 60° C. to 76° C. This saccharified liquid was filtered with a lauter that was a filter tank, then transferred to a boiling kettle, bitter hops were added, and boiled for 60 minutes. After boiling, warm water equivalent to the evaporated component was added, hot tub was removed in a whirlpool tank, followed by cooling to 10° C. using a plate cooler to obtain cold wort. Bottom-fermenting beer yeast was added to this wort and fermented it at around 10° C. for 7 days, after which the beer yeast was removed. The tank was changed, the resulting wort was matured for 7 days, then cooled to around −1° C. and stabilized for 14 days. After dilution by adding gas-removed water, filtration was conducted using diatomaceous earth to obtain a wort fermented liquid.

[Measurement of Aroma Components]

Among the aroma components of the obtained wort fermented liquid, ethyl acetate, isobutanol, isoamyl acetate, isoamyl alcohol, ethyl caproate, ethyl caprylate and β-phenethyl acetate were measured. The headspace GC method was used for the measurement. The gas chromatograph used was GC-2010 (manufactured by SHIMADZ CORPORATION), and the column used was Stabilwax 30 m×0.32 mm ID (1 μm FT). The analysis results are shown in Table 2.

TABLE 2

Aroma components of wort fermented liquid

| Component name | Concentration (ppm) |
|---|---|
| Ethyl acetate | 14.3 |
| Isobutanol | 17.9 |
| Isoamyl acetate | 1.4 |
| Isoamyl alcohol | 90.3 |
| Ethyl caproate | 0.1 |
| Ethyl caprylate | 0.2 |
| β-Phenethyl acetate | 0.6 |

[Measurement of Sour Component]

Phosphoric acid, citric acid, pyruvic acid, malic acid, succinic acid, lactic acid, formic acid, acetic acid and pyroglutamic acid in the obtained fermented wheat juice were measured by the Shimadzu Organic Acid Analysis System (SCL-10A_VP). Specifically, the separation was performed by ion exclusion chromatography using Shim-pack SCR-102H (8.0 mmΦ 10×300 mm) (two in series), and the post-column pH buffered electrical conductivity method (CCD-10A_VP) was used. Detected by. The analysis results are shown in Table 3.

TABLE 3

Sour components of wort fermented liquid

| Component name | Concentration (ppm) |
|---|---|
| Phosphoric acid | 428.0 |
| Citric acid | 225.7 |
| Pyruvic acid | 101.5 |
| Malic acid | 120.5 |
| Succinic acid | 68.2 |
| Lactic acid | 431.7 |
| Formic acid | 0 |
| Acetic acid | 64.5 |
| Pyroglutamic acid | 138.1 |

[Production of Low-Alcohol Beer-Taste Beverage Containing Aroma Composition]

After adjusting the gas pressure of the wort fermented liquid (liquid temperature 0° C.) obtained above to 0.20 MPa, the liquid temperature was adjusted from 55 to 65° C. with a heat exchanger, and the resulting liquid was sprayed into a gas-removing tank under a reduced pressure of about 90 mbar to vaporize carbon dioxide gas and aroma components. The vaporized aroma components were condensed by cooling them to about 20° C. to obtain an aroma composition.

The wort fermented liquid in which the aroma components were vaporized was heated to around 50° C. using a plate cooler. Thereafter, it was brought into contact with water vapor heated to around 50° C. in a column at a reduced pressure of around 90 mbar to adsorb volatile components to the water vapor so that alcohol and volatile components were removed. Thereafter, the aroma composition was returned to the alcohol-removed wort fermented liquid to produce a low-alcohol beer-taste beverage containing an aroma composition. The obtained low-alcohol beer-taste beverage containing the aroma composition was used as sample 1. The alcohol content of sample 1 was less than 1%.

The analysis results of the aroma components and the analysis results of the sour components of Sample 1 are shown, respectively, in Table 4 and Table 5. The degree of sourness in Table 5 was calculated using values in Table 1.

TABLE 4

| Aroma components of sample 1 | |
|---|---|
| Component name | Concentration (ppm) |
| Ethyl acetate | 1.95 |
| Isobutanol | 3.31 |
| Isoamyl acetate | 0.26 |
| Isoamyl alcohol | 17.4 |
| Ethyl caproate | 0.020 |
| Ethyl caprylate | 0.030 |
| β-Phenethyl acetate | 0.070 |

TABLE 5

| Sour components of sample 1 | | |
|---|---|---|
| Component name | Concentration (ppm) | Degree of sourness (ppm) |
| Phosphoric acid | 355.7 | 711.3 |
| Citric acid | 186.4 | 186.4 |
| Pyruvic acid | 80.0 | — |
| Malic acid | 100.1 | 125.1 |
| Succinic acid | 59.6 | 68.5 |
| Lactic acid | 348.1 | 417.8 |
| Formic acid | 0 | — |
| Acetic acid | 52.8 | 55.5 |
| Pyroglutamic acid | 115.9 | — |
| Total | | 1564.4 |

Comparative Example 1

[Production of Low-Alcohol Beer-Taste Beverages Containing Aroma Composition]

A low-alcohol beer-taste beverage containing an aroma composition was produced in the same manner as in the example except that the gas pressure of the wort fermented liquid (liquid temperature 0° C.) before spraying it into the gas-removed tank was adjusted to 0.04 MPa. The obtained low-alcohol beer-taste beverage containing the aroma composition was used as sample 2. The alcohol content of sample 2 was less than 1%.

The analysis results of the aroma components and the analysis results of the sour components of sample 2 are shown, respectively, in Table 6 and Table 7. The degree of sourness in Table 7 was calculated using values in Table 1.

TABLE 6

| Aroma components of sample 2 | |
|---|---|
| Component name | Concentration (ppm) |
| Ethyl acetate | 0.30 |
| Isobutanol | 0.42 |
| Isoamyl acetate | 0.02 |
| Isoamyl alcohol | 1.93 |
| Ethyl caproate | 0.001 |
| Ethyl caprylate | 0.006 |
| β-Phenethyl acetate | 0.010 |

TABLE 7

| Sour components of sample 2 | | |
|---|---|---|
| Component name | Concentration (ppm) | Degree of sourness (ppm) |
| Phosphoric acid | 355.7 | 711.3 |
| Citric acid | 186.4 | 186.4 |
| Pyruvic acid | 80.0 | — |
| Malic acid | 100.1 | 125.1 |
| Succinic acid | 59.6 | 68.5 |
| Lactic acid | 348.1 | 417.8 |
| Formic acid | 0 | — |
| Acetic acid | 52.8 | 55.5 |
| Pyroglutamic acid | 115.9 | — |
| Total | | 1564.4 |

Comparative Example 2

[Production of Low-Alcohol Beer-Taste Beverages Containing No Aroma Composition]

A low-alcohol beer-taste beverage containing an aroma composition was produced in the same manner as in the example except that the gas pressure of the wort fermented liquid (liquid temperature 0° C.) before spraying it into the gas-removed tank was adjusted to 0.04 MPa, and that the aroma composition was not returned to the alcohol-removed wort-fermented liquid. The obtained low-alcohol beer-taste beverage containing the aroma composition was used as sample 3. The alcohol content of sample 3 was less than 1%.

The analysis results of the aroma components and the analysis results of the sour components of sample 3 are shown, respectively, in Table 8 and Table 9. The degree of sourness in Table 9 was calculated using values in Table 1.

TABLE 8

| Aroma components of sample 3 | |
|---|---|
| Component name | Concentration (ppm) |
| Ethyl acetate | 0 |
| Isobutanol | 0 |
| Isoamyl acetate | 0 |
| Isoamyl alcohol | 0 |
| Ethyl caproate | 0 |
| Ethyl caprylate | 0 |
| β-Phenethyl acetate | 0 |

TABLE 9

| Sour components of sample 3 | | |
|---|---|---|
| Component name | Concentration (ppm) | Degree of sourness (ppm) |
| Phosphoric acid | 355.7 | 711.3 |
| Citric acid | 186.4 | 186.4 |
| Pyruvic acid | 80.0 | — |
| Malic acid | 100.1 | 125.1 |
| Succinic acid | 59.6 | 68.5 |
| Lactic acid | 348.1 | 417.8 |
| Formic acid | 0 | — |
| Acetic acid | 52.8 | 55.5 |
| Pyroglutamic acid | 115.9 | — |
| Total | | 1564.4 |

Reference Example

[Changes of Aroma Component Concentration and Type]

By mixing samples 1 and 3 at different ratios, 1 L low-alcohol beer-taste beverages having different concentrations of aroma components were produced and used as samples 4 to 9, respectively. The degrees of sourness of samples 4 to 9 was all 1564.4 ppm.

<Sensory Evaluation of Non-Alcohol Beer-Taste Beverages>

Non-alcohol beer-taste beverages produced as described above were subjected to sensory evaluation. The evaluators were 6 trained panelists. The evaluation items were the sour feeling, astringent feeling, alcohol feeling, and complex taste derived from brewing.

In the evaluation method, the temperature of the sample was adjusted to a liquid temperature of about 4° C., and the sensory intensity of the above items felt at that time was scored on a 5-levels scale. For the score, the score of sample 1 was given 3, given 4 if it was felt slightly strongly, 5 if it was felt strongly, 2 if it was felt slightly weakly, 1 if it was felt weakly, and finally the average of the scores of the 6 was calculated. The evaluation criteria for beer-like flavor are as follows.

Good "A": The average of the scores for the sour feeling and astringent feeling was 2.0 or less, and the average of the scores for the alcohol feeling and complex taste derived from brewing was 4.0 or more.

Acceptable "B": The average of the scores for the sour feeling and astringent feeling was more than 2.0 and 2.5 or less, and the average of the scores for the alcohol feeling and complex taste derived from brewing was 3.5 or more and less than 4.0.

Fail "C": The average of the scores for the sour feeling and astringent feeling exceeded 2.5.

Table 10 showed the aroma component concentrations and evaluation results of samples 4 to 9.

TABLE 10

| Evaluation of mixed sample | | | | | | | | |
|---|---|---|---|---|---|---|---|---|
| | | Sample 4 | Sample 5 | Sample 6 | Sample 7 | Sample 8 | Sample 9 |
| Composition of beverage sample | Blending ratio of sample 1 (%) | 0 | 10 | 25 | 50 | 75 | 100 |
| | Blending ratio of sample 3 (%) | 100 | 90 | 75 | 50 | 25 | 0 |
| | Ethyl acetate concentration (ppm) | 0 | 0.2 | 0.49 | 0.98 | 1.46 | 1.95 |
| | Isobutanol concentration (ppm) | 0 | 0.33 | 0.83 | 1.66 | 2.48 | 3.31 |
| | Isoamyl acetate concentration (ppm) | 0 | 0.026 | 0.065 | 0.13 | 0.2 | 0.26 |
| | Isoamyl alcohol concentration (ppm) | 0 | 1.74 | 4.35 | 8.7 | 13.1 | 17.4 |
| | Ethyl caproate concentration (ppm) | 0 | 0.002 | 0.005 | 0.01 | 0.015 | 0.02 |
| | Ethyl caprylate concentration (ppm) | 0 | 0.003 | 0.0075 | 0.015 | 0.023 | 0.03 |
| | β-Phenethyl acetate concentration (ppm) | 0 | 0.007 | 0.0175 | 0.035 | 0.053. | 0.07 |
| Sensory evaluation | Sour feeling | 3.00 | 2.83 | 2.33 | 1.67 | 1.33 | 1.00 |
| | Astringent feeling | 3.00 | 2.83 | 2.50 | 1.83 | 1.67 | 1.00 |
| | Alcohol feeling | 3.00 | 3.17 | 3.50 | 4.17 | 4.83 | 5.00 |
| | Complex taste derived from brewing | 3.00 | 3.50 | 3.50 | 4.17 | 4.67 | 5.00 |
| | Beer-like flavor | — | C | B | A | A | A |

From the sensory evaluation results in Table 10, at a minimum, in the aroma component concentrations of sample 6 (ethyl acetate concentration 0.49 ppm, isobutanol concentration 0.83 ppm, isoamyl acetate concentration 0.065 ppm, isoamyl alcohol concentration 4.35 ppm), it was shown that the sourness of the low-alcohol beer-taste beverages was suppressed. It was also shown that, by the aroma component concentrations of Sample 6, the astringency was suppressed and the alcohol feeling was enhanced.

In addition, in order to investigate how each type of aroma component affects the flavor of low-alcohol beer-taste beverages, samples 10 to 37 were produced by changing the concentration of each of the aroma components of sample 7 one by one. The degrees of sourness of samples 10 to 37 were all 1564.4 ppm. The sensory evaluation results of samples 10 to 37 were shown in Tables 11 to 15.

TABLE 11

| | | Sample 10 | Sample 11 | Sample 12 | Sample 13 | Sample 14 | Sample 15 |
|---|---|---|---|---|---|---|---|
| Composition of beverage sample | Blending ratio of sample 1 (%) | 0 | 0 | 0 | 0 | 0 | 0 |
| | Blending ratio of sample 3 (%) | 100 | 100 | 100 | 100 | 100 | 100 |
| | Ethyl acetate concentration (ppm) | 0 | 0.6 | 19 | 26 | 0.98 | 0.98 |
| | Isobutanol concentration (ppm) | 1.66 | 1.66 | 1.66 | 1.66 | 0 | 1.1 |
| | Isoamyl acetate concentration (ppm) | 0.13 | 0.13 | 0.13 | 0.13 | 0.13 | 0.13 |
| | Isoamyl alcohol concentration (ppm) | 8.7 | 8.7 | 8.7 | 8.7 | 8.7 | 8.7 |
| | Ethyl caproate concentration (ppm) | 0.01 | 0.01 | 0.01 | 0.01 | 0.01 | 0.01 |
| | Ethyl caprylate concentration (ppm) | 0.015 | 0.015 | 0.015 | 0.015 | 0.015 | 0.015 |
| | β-Phenethyl acetate concentration (ppm) | 0.035 | 0.035 | 0.035 | 0.035 | 0.035. | 0.035 |
| Sensory evaluation | Sour feeling | 2.83 | 1.83 | 1.17 | 1.17 | 2.83 | 2.50 |
| | Astringent feeling | 2.83 | 2.17 | 1.17 | 1.17 | 2.83 | 2.33 |
| | Alcohol feeling | 3.17 | 3.83 | 4.83 | 4.83 | 3.17 | 3.83 |
| | Complex taste derived from brewing | 3.50 | 4.00 | 4.83 | 4.83 | 3.50 | 4.00 |
| | Beer-like flavor | C | B | A | B | C | B |

TABLE 12

| | | Sample 16 | Sample 17 | Sample 18 | Sample 19 | Sample 20 | Sample 21 |
|---|---|---|---|---|---|---|---|
| Composition of beverage sample | Blending ratio of sample 1 (%) | 0 | 0 | 0 | 0 | 0 | 0 |
| | Blending ratio of sample 3 (%) | 100 | 100 | 100 | 100 | 100 | 100 |
| | Ethyl acetate concentration (ppm) | 0.98 | 0.98 | 0.98 | 0.98 | 0.98 | 0.98 |
| | Isobutanol concentration (ppm) | 90 | 120 | 1.66 | 1.66 | 1.66 | 1.66 |
| | Isoamyl acetate concentration (ppm) | 0.13 | 0.13 | 0 | 0.06 | 1.0 | 1.4 |
| | Isoamyl alcohol concentration (ppm) | 8.7 | 8.7 | 8.7 | 8.7 | 8.7 | 8.7 |
| | Ethyl caproate concentration (ppm) | 0.01 | 0.01 | 0.01 | 0.01 | 0.01 | 0.01 |
| | Ethyl caprylate concentration (ppm) | 0.015 | 0.015 | 0.015 | 0.015 | 0.015 | 0.015 |
| | β-Phenethyl acetate concentration (ppm) | 0.035 | 0.035 | 0.035 | 0.035 | 0.035. | 0.035 |
| Sensory evaluation | Sour feeling | 1.17 | 1.17 | 2.83 | 2.33 | 1.33 | 1.17 |
| | Astringent feeling | 1.17 | 1.17 | 2.83 | 2.50 | 1.33 | 1.17 |
| | Alcohol feeling | 4.83 | 4.83 | 3.17 | 3.83 | 4.83 | 4.83 |
| | Complex taste derived from brewing | 4.67 | 4.83 | 3.50 | 4.17 | 5.00 | 4.83 |
| | Beer-like flavor | A | B | C | B | A | B |

TABLE 13

| | | Sample 22 | Sample 23 | Sample 24 | Sample 25 | Sample 26 | Sample 27 |
|---|---|---|---|---|---|---|---|
| Composition of beverage sample | Blending ratio of sample 1 (%) | 0 | 0 | 0 | 0 | 0 | 0 |
| | Blending ratio of sample 3 (%) | 100 | 100 | 100 | 100 | 100 | 100 |
| | Ethyl acetate concentration (ppm) | 0.98 | 0.98 | 0.98 | 0.98 | 0.98 | 0.98 |
| | Isobutanol concentration (ppm) | 1.66 | 1.66 | 1.66 | 1.66 | 1.66 | 1.66 |
| | Isoamyl acetate concentration (ppm) | 0.13 | 0.13 | 0.13 | 0.13 | 0.13 | 0.13 |
| | Isoamyl alcohol concentration (ppm) | 3.0 | 6.0 | 60 | 80 | 8.7 | 8.7 |
| | Ethyl caproate concentration (ppm) | 0.01 | 0.01 | 0.01 | 0.01 | 0 | 0.007 |
| | Ethyl caprylate concentration (ppm) | 0.015 | 0.015 | 0.015 | 0.015 | 0.015 | 0.015 |

TABLE 13-continued

| | | Sample 22 | Sample 23 | Sample 24 | Sample 25 | Sample 26 | Sample 27 |
|---|---|---|---|---|---|---|---|
| | β-Phenethyl acetate concentration (ppm) | 0.035 | 0.035 | 0.035 | 0.035 | 0.035 | 0.035 |
| Sensory evaluation | Sour feeling | 2.67 | 2.33 | 1.33 | 1.17 | 2.50 | 2.33 |
| | Astringent feeling | 2.67 | 2.50 | 1.33 | 1.17 | 2.50 | 2.33 |
| | Alcohol feeling | 3.50 | 3.83 | 4.67 | 4.83 | 3.50 | 3.83 |
| | Complex taste derived from brewing | 3.67 | 4.00 | 4.67 | 4.83 | 3.67 | 3.83 |
| | Beer-like flavor | C | B | A | B | B | B |

TABLE 14

| | | Sample 28 | Sample 29 | Sample 30 | Sample 31 | Sample 32 | Sample 33 |
|---|---|---|---|---|---|---|---|
| Composition of beverage sample | Blending ratio of sample 1 (%) | 0 | 0 | 0 | 0 | 0 | 0 |
| | Blending ratio of sample 3 (%) | 100 | 100 | 100 | 100 | 100 | 100 |
| | Ethyl acetate concentration (ppm) | 0.98 | 0.98 | 0.98 | 0.98 | 0.98 | 0.98 |
| | Isobutanol concentration (ppm) | 1.66 | 1.66 | 1.66 | 1.66 | 1.66 | 1.66 |
| | Isoamyl acetate concentration (ppm) | 0.13 | 0.13 | 0.13 | 0.13 | 0.13 | 0.13 |
| | Isoamyl alcohol concentration (ppm) | 8.7 | 8.7 | 8.7 | 8.7 | 8.7 | 8.7 |
| | Ethyl caproate concentration (ppm) | 0.18 | 0.30 | 0.01 | 0.01 | 0.01 | 0.01 |
| | Ethyl caprylate concentration (ppm) | 0.015 | 0.015 | 0 | 0.02 | 0.3 | 0.5 |
| | β-Phenethyl acetate concentration (ppm) | 0.035 | 0.035 | 0.035 | 0.035 | 0.035. | 0.035 |
| Sensory evaluation | Sour feeling | 1.33 | 1.17 | 2.50 | 2.50 | 1.17 | 1.17 |
| | Astringent feeling | 1.33 | 1.33 | 2.50 | 2.50 | 1.17 | 1.17 |
| | Alcohol feeling | 4.67 | 4.83 | 3.50 | 3.83 | 4.83 | 4.83 |
| | Complex taste derived from brewing | 4.67 | 4.83 | 3.50 | 3.67 | 4.83 | 4.83 |
| | Beer-like flavor | A | B | B | B | A | B |

TABLE 15

| | | Sample 34 | Sample 35 | Sample 36 | Sample 37 |
|---|---|---|---|---|---|
| Composition of beverage sample | Blending ratio of sample 1 (%) | 0 | 0 | 0 | 0 |
| | Blending ratio of sample 3 (%) | 100 | 100 | 100 | 100 |
| | Ethyl acetate concentration (ppm) | 0.98 | 0.98 | 0.98 | 0.98 |
| | Isobutanol concentration (ppm) | 1.66 | 1.66 | 1.66 | 1.66 |
| | Isoamyl acetate concentration (ppm) | 0.13 | 0.13 | 0.13 | 0.13 |
| | Isoamyl alcohol concentration (ppm) | 8.7 | 8.7 | 8.7 | 8.7 |
| | Ethyl caproate concentration (ppm) | 0.01 | 0.01 | 0.01 | 0.01 |
| | Ethyl caprylate concentration (ppm) | 0.015 | 0.015 | 0.015 | 0.015 |
| | β-Phenethyl acetate concentration (ppm) | 0 | 0.03 | 2.5 | 4.0 |
| Sensory evaluation | Sour feeling | 2.50 | 2.50 | 1.17 | 1.17 |
| | Astringent feeling | 2.50 | 2.50 | 1.17 | 1.17 |
| | Alcohol feeling | 3.33 | 3.67 | 4.83 | 4.83 |
| | Complex taste derived from brewing | 3.50 | 3.83 | 4.83 | 4.67 |
| | Beer-like flavor | B | B | A | B |

From the sensory evaluation results of samples 10 to 25, for ethyl acetate, isobutanol, isoamyl acetate and isoamyl alcohol, depending on their presence or absence and their increased concentrations, the sourness and astringency of the low-alcohol beer-taste beverages were suppressed, and their alcohol feeling and complex taste derived from brewing increased, indicating that they were aroma components having a high flavor improving effect.

From the sensory evaluation results of samples 26 to 37, for ethyl caproate, ethyl caprylate, and β-phenethyl acetate, depending on their presence or absence, the sourness and astringency, their alcohol feeling and complex taste derived from brewing of the low-alcohol beer-taste beverages did not change very much, thus indicating that they were aroma components having a low flavor improving effect.

What is claimed is:

1. A low-alcohol beer-taste beverage comprising an aroma composition and an alcohol-removed wort fermented liquid,
 the aroma composition comprising:
 49 ppm to 1.95 ppm of ethyl acetate,
 83 ppm or more of isobutanol,
 0.065 ppm or more of isoamyl acetate,
 4.35 ppm or more of isoamyl alcohol, and
 1,000 ppm or more of a sour component as a degree of sourness, and
 the wort fermented liquid having a malt use ratio of 50% or more.

2. The low-alcohol beer-taste beverage according to claim 1, wherein the aroma composition comprises 0.83 to 120 ppm of isobutanol, 0.065 to 1.4 ppm of isoamyl acetate, and 4.35 to 90.3 ppm isoamyl alcohol.

3. The low-alcohol beer-taste beverage according to claim 1, comprising 1,000 to 3,500 ppm of the sour component as the degree of sourness.

4. The low-alcohol beer-taste beverage according to claim 1, wherein the wort fermented liquid is a wort bottom fermented liquid.

5. The low-alcohol beer-taste beverage according to claim 1, wherein the low-alcohol beer-taste beverage is a non-alcoholic beer-taste beverage.

6. A method for producing the low-alcohol beer-taste beverage according to claim 1, comprising:
 a step of adjusting an amount of carbon dioxide gas pressure of a wort fermented liquid from 0.05 to 0.25 MPa;
 a step of vaporizing carbon dioxide gas and aroma components from the wort fermented liquid by spraying the wort fermented liquid under a reduced pressure;
 a step of condensing the vaporized aroma components to obtain an aroma composition; and
 a step of adding the obtained aroma composition to a low-alcohol beer-taste beverage to obtain the low-alcohol beer-taste beverage according to claim 1.

7. The method according to claim 6, wherein the low-alcohol beer-taste beverage to which the aroma composition is added is obtained by subjecting the wort fermented liquid to an alcohol-removing treatment.

8. The method according to claim 6, wherein the aroma composition comprises 0.49 ppm to 1.95 ppm of ethyl acetate, 0.83 ppm or more of isobutanol, 0.065 ppm or more of isoamyl acetate, and 4.35 ppm or more of isoamyl alcohol.

9. The method according to claim 6, wherein the aroma composition comprises 0.49 to 1.95 ppm of ethyl acetate, 0.83 to 120 ppm of isobutanol, 0.065 to 1.4 ppm of isoamyl acetate, and 4.35 to 90.3 ppm of isoamyl alcohol.

10. The method according to claim 6, wherein the low-alcohol beer-taste beverage to which the aroma composition is added, comprises the alcohol-removed wort fermented liquid.

11. A method for suppressing sourness and astringency, and enhancing an alcohol feeling and a complex taste derived from brewing the low-alcohol beer-taste beverage according to claim 1, the method comprising:
 a step of adjusting an amount of carbon dioxide gas pressure of a wort fermented liquid from 0.05 to 0.25 MPa;
 a step of vaporizing carbon dioxide gas and aroma components from the wort fermented liquid by spraying the wort fermented liquid under a reduced pressure;
 a step of condensing the vaporized aroma components to obtain an aroma composition; and
 a step of adding the obtained aroma composition to a low-alcohol beer-taste beverage to obtain the low-alcohol beer-taste beverage according to claim 1.

12. The method according to claim 11, wherein the low-alcohol beer-taste beverage to which the aroma composition is added is obtained by subjecting the wort fermented liquid to an alcohol-removing treatment.

13. The method according to claim 11, wherein the aroma composition comprises 0.49 ppm to 1.95 ppm of ethyl acetate, 0.83 ppm or more of isobutanol, 0.065 ppm or more of isoamyl acetate, and 4.35 ppm or more of isoamyl alcohol.

14. The method according to claim 11, wherein the aroma composition comprises 0.49 to 1.95 ppm of ethyl acetate, 0.83 to 120 ppm of isobutanol, 0.065 to 1.4 ppm of isoamyl acetate, and 4.35 to 90.3 ppm of isoamyl alcohol.

15. The method according to claim 11, wherein the low-alcohol beer-taste beverage to which the aroma composition is added, comprises the alcohol-removed wort fermented liquid.

* * * * *